United States Patent
Jain et al.

(10) Patent No.: US 11,371,395 B2
(45) Date of Patent: Jun. 28, 2022

(54) GLAND STEAM CONDENSER FOR A COMBINED CYCLE POWER PLANT AND METHODS OF OPERATING THE SAME

(71) Applicant: General Electric Company, Schenectady, NY (US)

(72) Inventors: Rajkumar Jain, Bangalore (IN); Sudhir Ramesh Chaudhari, Bangalore (IN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 17/003,535

(22) Filed: Aug. 26, 2020

(65) Prior Publication Data

US 2022/0065138 A1    Mar. 3, 2022

(51) Int. Cl.
*F01K 23/10*    (2006.01)
*F01K 9/00*    (2006.01)
*F01K 9/02*    (2006.01)
*F01K 13/00*    (2006.01)

(52) U.S. Cl.
CPC .............. *F01K 23/10* (2013.01); *F01K 9/003* (2013.01); *F01K 9/023* (2013.01); *F01K 13/006* (2013.01)

(58) Field of Classification Search
CPC .......... F01K 23/10; F01K 9/003; F01K 9/023; F01K 13/006
See application file for complete search history.

(56) References Cited

U.S. PATENT DOCUMENTS

| | | | | |
|---|---|---|---|---|
| 3,537,265 A | | 11/1970 | Brown | |
| 4,282,708 A | * | 8/1981 | Kuribayashi | F01K 23/10 60/39.182 |
| 4,517,804 A | * | 5/1985 | Ura | F28F 9/00 277/432 |
| 4,793,141 A | | 12/1988 | Yanai et al. | |
| 4,873,829 A | * | 10/1989 | Williamson | F01K 9/02 60/670 |

(Continued)

FOREIGN PATENT DOCUMENTS

| EP | 2778368 A1 | 9/2014 |
|---|---|---|
| JP | H03115706 A | 5/1991 |

OTHER PUBLICATIONS

Extended European Search Report for Patent Application 21190903.1 dated Jan. 27, 2022; 9 pp.

*Primary Examiner* — Jesse S Bogue
(74) *Attorney, Agent, or Firm* — Armstrong Teasdale LLP

(57) ABSTRACT

A combined cycle power plant that includes a gas turbine engine, a heat recovery steam generator (HRSG), a steam turbine, a primary condenser, a condensate extraction pump, a gland steam condenser, and a cooling module. The HRSG generates steam. The steam turbine receives steam from the HRSG. The primary condenser is fluidly coupled to the steam turbine and receives a first portion of exhaust steam from the steam turbine. The condensate extraction pump is fluidly coupled to the primary condenser and receives a condensed first portion of exhaust steam. The gland steam condenser is fluidly coupled to the steam turbine and receives a second portion of exhaust steam from the steam turbine. The cooling module is fluidly coupled to the gland steam condenser and supplies a cooling fluid to the gland steam condenser. The cooling module is fluidly isolated from the condensate extraction pump.

20 Claims, 3 Drawing Sheets

(56) References Cited

U.S. PATENT DOCUMENTS

| | | | |
|---|---|---|---|
| 5,095,706 A | 3/1992 | Saito et al. | |
| 5,423,377 A * | 6/1995 | Iwata | F28B 9/08 |
| | | | 165/110 |
| 7,147,427 B1 * | 12/2006 | Campbell | F01D 11/04 |
| | | | 415/1 |
| 8,418,467 B2 * | 4/2013 | Muthuramalingam | F01K 7/34 |
| | | | 60/661 |
| 8,919,328 B2 * | 12/2014 | Nelson | F02B 47/08 |
| | | | 123/568.12 |
| 8,943,836 B2 * | 2/2015 | Rose | F01K 3/245 |
| | | | 60/772 |
| 9,605,564 B2 * | 3/2017 | Mohr | F01K 9/003 |
| 10,760,453 B2 * | 9/2020 | Hirayama | F01K 13/02 |
| 2014/0318130 A1 | 10/2014 | Duong | |
| 2021/0095572 A1 * | 4/2021 | Fujimura | F01K 23/108 |
| 2021/0108540 A1 * | 4/2021 | Kato | F01K 23/14 |

\* cited by examiner

GLAND STEAM CONDENSER FOR A COMBINED CYCLE POWER PLANT AND METHODS OF OPERATING THE SAME

BACKGROUND

The present disclosure relates generally to gland steam condensers and, more specifically, to systems and methods of operating gland steam condensers in combined cycle power plants.

Steam gas turbines in combined cycle power plants use primary condensers to condense the main exhaust steam and gland steam condensers to help control exhaust and steam leaks that may occur during operation of the steam gas turbines. Known gland steam condensers operate with a negative pressure as compared to the surrounding environment, thus causing the gland steam condensers to receive a mixture of steam and air from the steam gas turbines. The air is extracted from the mixture using a centrifugal blower, and the steam is extracted from the mixture using a heat exchanger that contains cold feedwater.

In conventional combined cycle power plants, a condensate extraction pump supplies cold feedwater from the primary condenser to the gland steam condenser as well as supplies water to a feedwater pump. The feedwater pump discharges to the heat recovery steam generator to generate steam for the steam turbine. Because the condensate extraction pump supplies both the gland steam condenser and the feedwater pump, the gland steam condenser system must typically be redesigned for each installation, depending on the operating parameters of the condensate extraction pump. Additionally, in some combined cycle power plant systems, the gland steam condenser must operate continuously to maintain the steam turbine under vacuum overnight. Operating the gland steam condenser continuously requires that the condensate extraction pump also run continuously.

For example, at least some known gland steam condensers operate under elevated temperatures and pressures and require a high throughput of feedwater and, because they operate continuously, are a parasitic load against the output of the combined cycle power plant, thereby reducing the power plant's overall efficiency. Additionally, the operating parameters of the gland steam condenser can undesirably tax the condensate extraction pump and require a large amount of water to be delivered at a relatively high pressure through the gland steam condenser. Additionally, in some known power plants, the gland steam condenser is the only condenser to use water supplied from the primary condenser as a cooling source.

BRIEF DESCRIPTION

In one aspect, a combined cycle power plant is provided. The power plant includes a gas turbine engine, a heat recovery steam generator, a steam turbine, a primary condenser, a condensate extraction pump, a gland steam condenser, and a cooling module. The heat recovery steam generator generates steam. The steam turbine fluidly is coupled to the heat recovery steam generator and receives steam from the heat recovery steam generator. The primary condenser is fluidly coupled to the steam turbine and receives a first portion of exhaust steam from the steam turbine that is condensed into liquid form. The condensate extraction pump is fluidly coupled to the primary condenser and receives the condensed first portion of exhaust steam. The gland steam condenser is fluidly coupled to the steam turbine and receives a second portion of exhaust steam from the steam turbine that is condensed into liquid form. The cooling module is fluidly coupled to the gland steam condenser and supplies a cooling fluid to the gland steam condenser. The cooling module is fluidly isolated from the condensate extraction pump.

In another aspect, a gland steam condenser for a combined cycle power plant is provided. The gland steam condenser is fluidly coupled to a closed cooling water fin fan cooler.

In yet another aspect, a method of operating a combined cycle power plant is provided. The method includes generating steam in a heat recovery steam generator. The method also includes channeling the steam from the heat recovery steam generator through a steam turbine. The method further includes channeling a first portion of exhaust steam from the steam turbine through a primary condenser and a condensate extraction pump. The method further includes channeling a second portion of exhaust steam into a gland steam condenser. Finally, the method includes channeling cooling fluid through the gland steam condenser from a cooling module to condense the second portion of exhaust steam, the cooling module being fluidly isolated from the condensate extraction pump.

DETAILED DESCRIPTION

The embodiments described herein relate to systems and methods for operating gland steam condensers within a power plant. Specifically, in the systems and methods described herein, steam generated from feedwater within a heat recover steam generator (HRSG) is cycled through various components of a steam turbine and a first portion of exhaust steam is channeled to a primary condenser prior to it being channeled to a condensate extraction pump. From the condensate extraction pump, the first portion of condensed exhaust steam is channeled through a feedwater pump prior to being returned to the HRSG. A second portion of exhaust steam, representing leaked steam from components of the steam turbine, as well as high-pressure exhaust steam, is channeled to a gland steam condenser as a mixture of air and steam. Within the gland steam condenser, steam is condensed from the mixture using cooling fluid supplied from a cooling module, and air is evacuated using a centrifugal blower. The cooling module is fluidly isolated from the condensate extraction pump. In some embodiments, the cooling module is also coupled to other components that require cooling fluid within the power plant, such as generator coolers and lube oil coolers, for example. Thus, the systems and method described herein enable the gland steam condenser to be fluidly isolated from the condensate extraction pump such that the gland steam condenser may be installed with consistent design specifications.

Unless otherwise indicated, approximating language, such as "generally," "substantially," and "about," as used herein indicates that the term so modified may apply to only an approximate degree, as would be recognized by one of ordinary skill in the art, rather than to an absolute or perfect degree. Accordingly, a value modified by a term or terms such as "about," "approximately," and "substantially" is not to be limited to the precise value specified. In at least some instances, the approximating language may correspond to the precision of an instrument for measuring the value. Additionally, unless otherwise indicated, the terms "first," "second," etc. are used herein merely as labels and are not intended to impose ordinal, positional, or hierarchical requirements on the items to which these terms refer. Moreover, reference to, for example, a "second" item does not require or preclude the existence of, for example, a "first" or lower-numbered item or a "third" or higher-numbered item.

Figure 1:
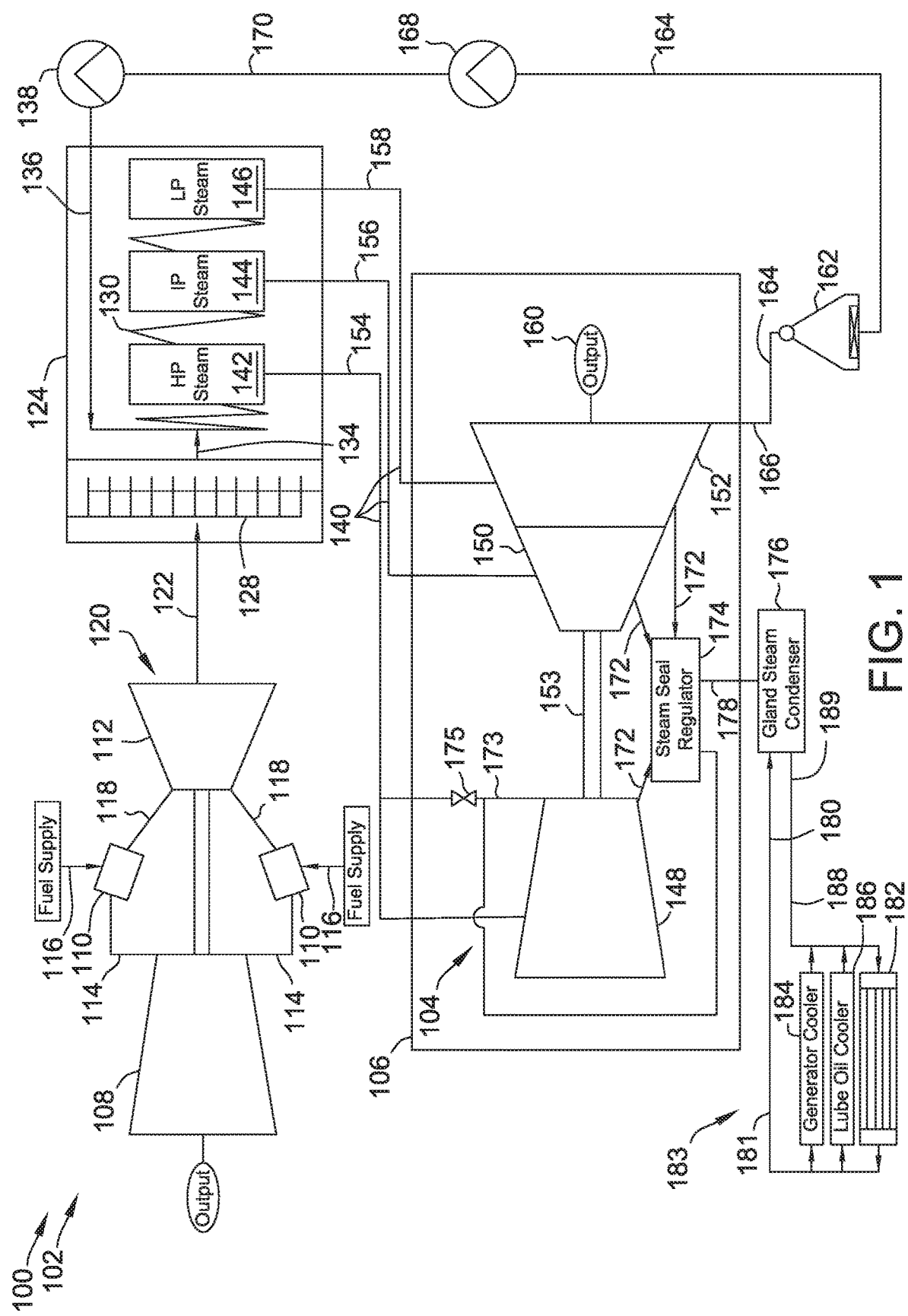
FIG. 1 is schematic illustration of an exemplary combined cycle power plant.

FIG. 1 is schematic illustration of an exemplary combined cycle power plant 100. In the exemplary embodiment, power plant 100 includes a gas turbine engine 102 and a steam turbine 104. Steam turbine 104 is contained within a steam turbine room 106. Gas turbine engine 102 includes a compressor section 108, a combustor 110, and a turbine section 112 coupled together in a serial flow relationship. In operation, combustor 110 receives air 114 from compressor section 108, and fuel 116 from a fuel supply and uses the fuel and air to create a fuel-air mixture that is combusted to generate combustion gases 118. Combustion gases 118 are channeled through turbine section 112 and discharged from an aft outlet 120 of turbine section 112 as an exhaust gas stream 122.

In the exemplary embodiment, power plant 100 also includes a heat recovery system 124 associated with gas turbine engine 102. Heat recovery system 124 includes an emissions reduction system 128 and a heat recovery steam generator (HRSG) 130 coupled in flow communication with emissions reduction system 128. During operation, exhaust gas stream 122 is received at emissions reduction system 128 to facilitate at least partial removal of oxides of nitrogen ($NO_x$) therefrom. A reduced gas stream 134 is then discharged from emissions reduction system 128 for interaction with feedwater 136 in HRSG 130. Reduced gas stream 134 heats feedwater 136 from a feedwater pump 138 to generate steam 140, which is then channeled towards steam turbine 104 for use in generating additional power.

In the exemplary embodiment, HRSG 130 includes a high pressure ("HP") steam section 142, an intermediate pressure ("IP") steam section 144 downstream from HP steam section 142, and a low pressure ("LP") steam section 146 downstream from IP steam section 144. Steam turbine 104 includes an HP steam turbine 148, an IP steam turbine 150, and a LP steam turbine 152 arranged along a central axis 153. During operation, HP steam section 142 converts feedwater 136 into HP steam and channels the HP steam through an HP steam line 154 to HP steam turbine 148. Similarly, IP steam section 144 converts feedwater 136 into IP steam and channels the IP steam through an IP steam line 156 to IP steam turbine 150. Further, during operation, LP steam section 146 converts feedwater 136 into LP steam and channels the LP steam through a LP steam line 158 to LP steam turbine 152. As steam 140 is channeled through each turbine 148, 150, 152 of steam turbine 104, steam turbine 104 generates a power output 160.

In the exemplary embodiment, power plant 100 includes a primary condenser 162 fluidly coupled to steam turbine 104. After steam 140 passes through steam turbine 104, a first portion of exhaust steam 164 travels through an exhaust line 166 to a primary condenser 162, which at least partially condenses first portion of exhaust steam 164 into liquid form. Primary condenser 162 is fluidly coupled to a condensate extraction pump 168 that also condenses first portion of exhaust steam 164 and pumps condensed water 170 to feedwater pump 138, to pressurize water 170 for use as high pressure feedwater 136 for HRSG 130.

The above-described cycling of water through feedwater pump 138, HRSG 130, steam turbine 104, primary condenser 162 and condensate extraction pump 168 is provided for exemplary purposes only. It will be appreciated that a number of other arrangements are possible without departing from the scope of this disclosure. For example, steam turbine 104 may include a plurality of LP steam turbines 152. Alternatively, power plant 100 may not include an IP steam section 144 and/or IP steam turbine 150.

During operation of steam turbine 104, HP turbine 148, IP turbine 150, and LP turbine 152 each may leak steam 172 into steam turbine room 106. In the exemplary embodiment, a steam seal regulator 174 facilitates controlling the flow of leaked steam 172 from various components of steam turbine 104. Additionally, HP exhaust steam 173 from HP steam turbine 148 is in fluid communication with steam seal regulator 174 and is controlled by an exhaust valve 175. During operation, HP exhaust steam 173 may feed components of steam turbine 104 or, alternatively, may travel to steam seal regulator 174.

Steam seal regulator 174 is fluidly coupled to gland steam condenser 176. In the exemplary embodiment, gland steam condenser 176 prevents steam from escaping steam turbine room 106 by creating a negative pressure as compared to the surrounding atmosphere, causing steam and air mixture 178 passing through steam seal regulator 174 to be drawn into gland steam condenser 176. Inside gland steam condenser 176, a cooling fluid 180 condenses the steam from steam and air mixture 178 and a centrifugal blower (not shown) evacuates the air portion.

In the exemplary embodiment, cooling fluid 180 is supplied to gland steam condenser 176 through a supply line 181 from a cooling module 182 in a cooling system 183. In one exemplary embodiment, cooling module 182 is fluidly isolated from condensate extraction pump 168. In the exemplary embodiment, cooling module 182 is a closed cooling water fin fan cooler, and cooling fluid 180 is water. In an example, cooling module 182 is also used to supply cooling fluid 180 to a generator cooler 184 and to a lube oil cooler 186 of power plant 100. In alternative embodiments, cooling module 182 may be used to supply cooling fluid 180 to other components of the power plant or only to gland steam condenser 176. In still further embodiments, cooling module 182 may be any cooling system that enables gland steam condenser 176 to function as described herein. After the steam in steam and air mixture 178 is condensed by gland steam condenser 176, heated water 188 is discharged from gland steam condenser 176 through a return line 189 to cooling module 182 to be cooled into cooling fluid 180.

In contrast to some known gland steam condensers that supply cold feedwater to both a gland steam condenser and a HRSG and operate under a pressure of 550 to 675 pounds per square inch gauge (PSIG), gland steam condenser 176 operates with less than about 500 PSIG of cooling fluid 180 flowing therethrough. In further embodiments, gland steam condenser 176 operates with between about 100 to about 180 PSIG of cooling fluid 180 therethrough. In still further embodiments, gland steam condenser 176 operates with between about 110 to about 130 PSIG or approximately 120 PSIG of cooling fluid 180 therethrough.

In one exemplary embodiment, the flow of cooling fluid 180 through gland steam condenser 176 is less than about 1250 gallons per minute (GPM), whereas the flow of cooling fluid in some conventional gland steam condensers is between 1,500 to 8,000 GPM. In further embodiments, the flow of cooling fluid 180 through gland steam condenser 176 is between about 400 to about 600 GPM. In still further embodiments, the flow of cooling fluid 180 through gland steam condenser 176 is between about 450 to about 550 GPM or approximately 500 GPM.

While conventional gland steam condensers use cooling fluid with temperatures between about 150 and about 200 degrees Fahrenheit, the temperature of cooling fluid 180 through present gland steam condenser 176 is less than about 125° Fahrenheit. In still further embodiments, temperature of cooling fluid 180 through gland steam condenser 176 is between about 50° Fahrenheit to about 100° Fahrenheit.

In one exemplary embodiment, gland steam condenser 176 operates using an input power of less than about 13 kilowatts. In further embodiments gland steam condenser 176 operates an input power of less than about 10 kilowatts. In still further embodiments, gland steam condenser 176 operates using an input power between about 4 to 8 kilowatts or using an input power of approximately 5 kilowatts. By comparison, conventional gland steam condensers use at least 15 kilowatts of power.

Figure 2:
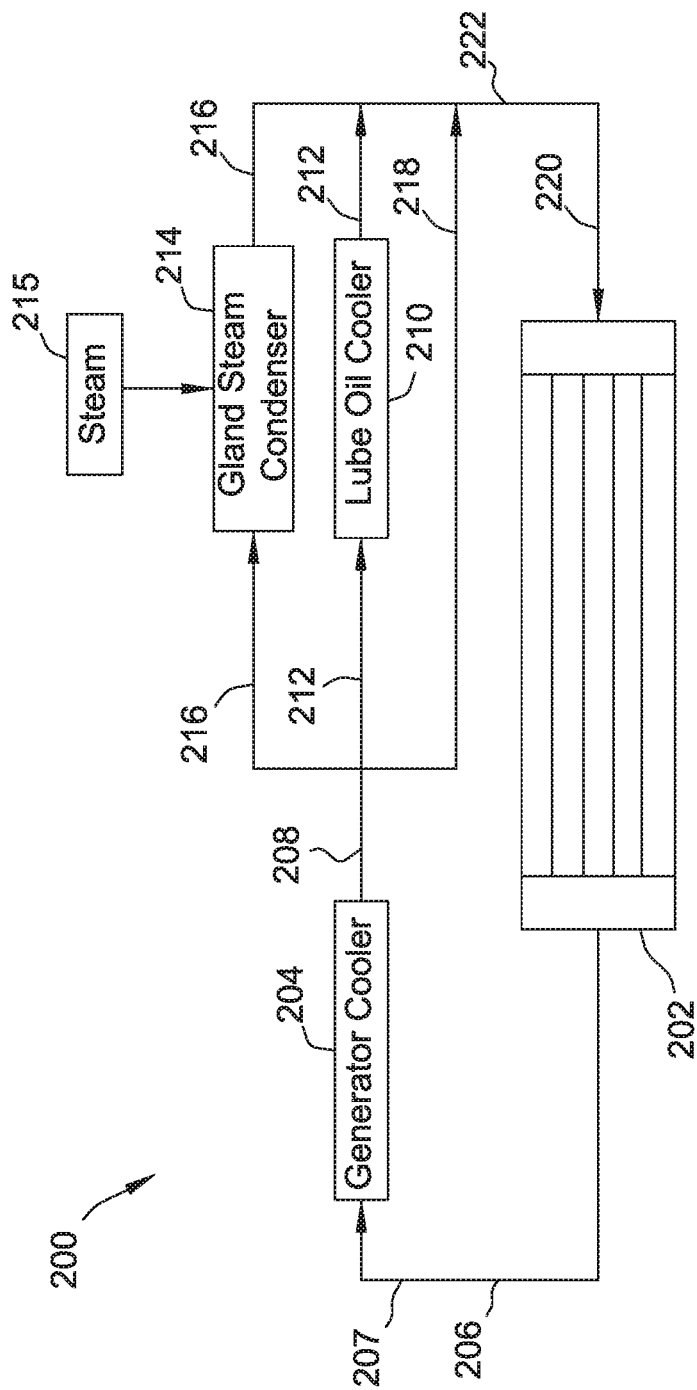
FIG. 2 is schematic illustration of an exemplary cooling system for use with the combined cycle power plant of FIG. 1.

FIG. 2 is schematic illustration of an exemplary cooling system 200, which may be used in place of cooling system 183 with combined cycle power plant 100 shown in FIG. 1. In the exemplary embodiment, cooling system 200 includes a cooling module 202 coupled in fluid communication with a generator cooler 204 via a supply line 206. In an example, cooling module 202 is a closed cooling water fin fan cooler. Also, in one embodiment, generator cooler 204 is a heat exchanger used to remove heat from generators used in conjunction with power plant 100. In one embodiment, during operation of cooling system 200, a cooling fluid 207 at a temperature of between about 125° to about 135° Fahrenheit is supplied to generator cooler 204 at a rate of between about 1,800 to about 2,200 GPM. More specifically, in one embodiment, during operation of cooling system 200, cooling fluid 207 at approximately 130° Fahrenheit is supplied to generator cooler 204 at a rate of approximately 2,000 GPM.

In an embodiment, after cooling fluid 207 is channeled through generator cooler 204, a heated fluid 208 is discharged from generator cooler 204. In one embodiment, main heated fluid 208 has an initial temperature of between about 135° and 145° Fahrenheit and, more specifically, a temperature of approximately 140° Fahrenheit. In one embodiment, a first portion 212 of main heated fluid 208 is channeled to lube oil cooler 210. Specifically, in one embodiment, first portion 212 of main heated fluid 208 is cycled through lube oil cooler 210 at a flow rate of between 900 to 1100 GPM and, in a further embodiment, at a flow rate of approximately 1000 GPM. In such an embodiment, after first portion 212 of main heated fluid 208 exits lube oil cooler 210, first portion 212 of main heated fluid 208 is at a temperature of about 155° to about 165° Fahrenheit and, more specifically, approximately 160° Fahrenheit.

In another embodiment, a second portion 216 of main heated fluid 208 is channeled to a gland steam condenser 214 that receives steam 215 from a steam turbine (shown as steam 178 in FIG. 1). Specifically, in such an embodiment, second portion 216 of main heated fluid 208 is cycled through gland steam condenser 214 at a flow rate of about 450 to 550 GPM and, in one embodiment, at a flow rate of approximately 500 GPM. In such an embodiment, after second portion 216 of main heated fluid 208 exits gland steam condenser 214, second portion 216 of main heated fluid 208 is at a temperature of about 145° to about 155° Fahrenheit and, more specifically, at a temperature of approximately 150° Fahrenheit.

In one embodiment, a third portion 218 of main heated fluid 208 does not pass through any additional coolers and thus remains at its original temperature. First portion 212, second portion 216, and third portion 218 are recombined in a return line 220 that creates a final heated fluid 222. In such an embodiment, final heated fluid 222 is channeled through return line 220 at a flow rate of between about 1800 to about 2200 GPM and, more specifically, at a flow rate of approximately 2000 GPM. Moreover, in the exemplary embodiment, final heated fluid 222 is at a temperature of between about 145° to about 155° Fahrenheit and, more specifically, at a temperature of approximately 150° Fahrenheit.

Figure 3:
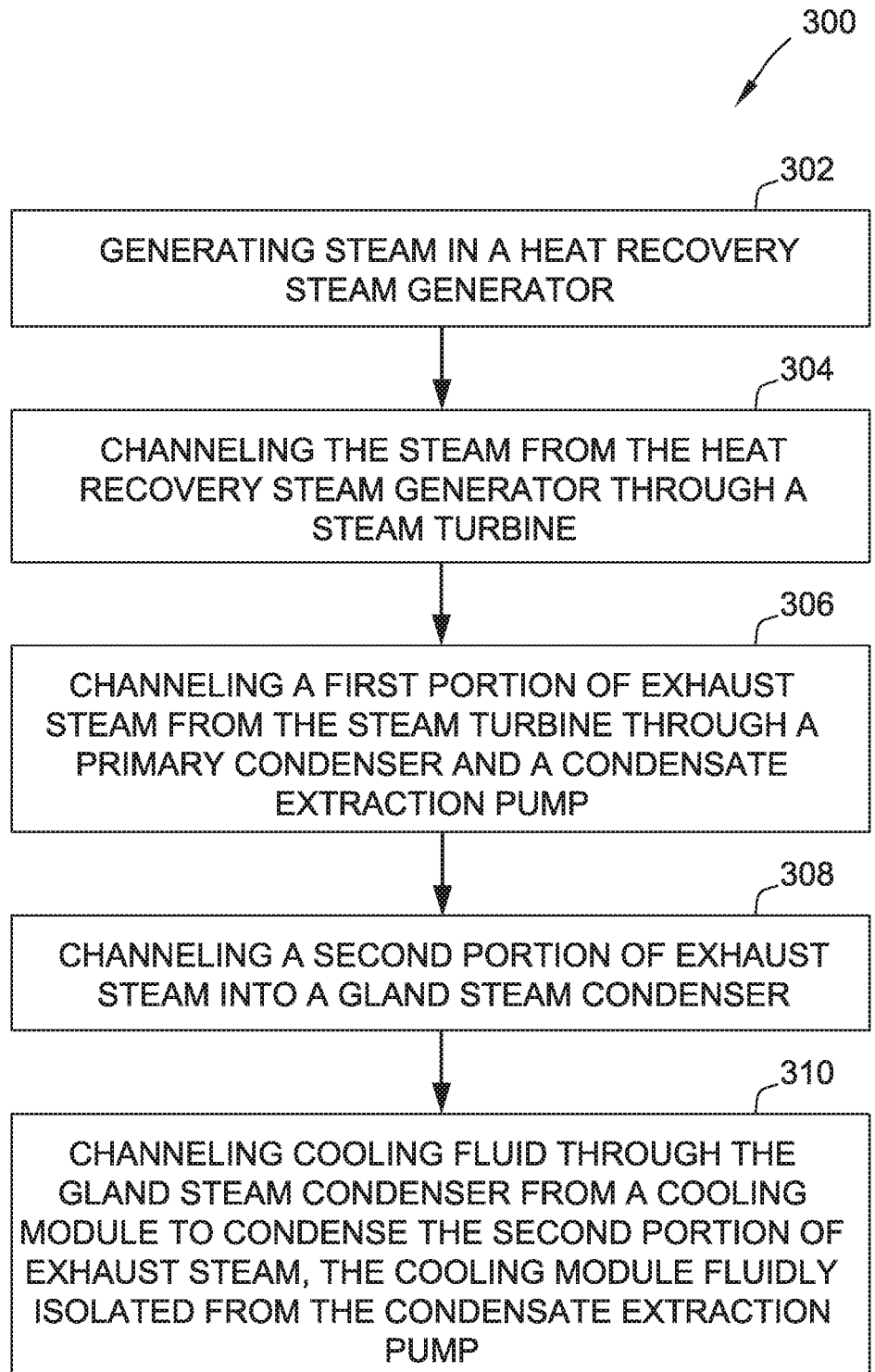
FIG. 3 is a flow diagram illustrating an exemplary method of operating a combined cycle power plant.

FIG. 3 is a flow diagram illustrating an exemplary method 300 of operating a combined cycle power plant, such as combined cycle power plant 100. In one embodiment, method 300 includes generating 302 steam, such as steam 140, in a HRSG, such as HRSG 130. In the exemplary embodiment, method 300 also includes channeling 304 the steam from the HRSG through a steam turbine, such as steam turbine 104. Method 300 also includes channeling 306 a first portion of exhaust steam, such as first portion of exhaust steam 164, from the steam turbine through a primary condenser, such has primary condenser 162, and to a condensate extraction pump, such as condensate extraction pump 168. Method 300 also includes channeling 308 a second portion of exhaust steam, such as leaked steam 172 and HP exhaust steam 173, into a gland steam condenser, such as gland steam condenser 176. Steps 306 and 308 may be performed simultaneously. Method 300 further includes channeling 310 cooling fluid, such as cooling fluid 180, through the gland steam condenser from a cooling module, such as cooling module 182, to condense the second portion of exhaust steam, the cooling module fluidly isolated from the condensate extraction pump.

The systems and methods described herein provide a number of benefits as compared to conventional gland steam condenser operations. Because the gland steam condenser is coupled to a closed cooling system, the operational parameters of the gland steam condenser can be standardized. Accordingly, the operations are not dependent on each specific installation of the combined cycle power system. Additionally, the systems and method described herein can have an increased operational efficiency. For example, in at least some known systems where the gland steam condenser is fluidly coupled to the condensate extraction pump, the condensate extraction pump must operate continuously to maintain a vacuum within the gland steam condenser. However, in the systems and methods described herein, the cooling module can be operated continuously using less energy and water, enabling the gland steam condenser to operate with less overall energy and water consumption. Further, in some embodiments described herein, the cooling module is used to cool other components in the power plant, such as the generator cooler and the lube oil cooler. In some such embodiments, the cooling module also operates continuously for those components. As such, the strain on the cooling module from adding the gland steam condenser is relatively minimal compared to continuous operation of the condensate extraction pump.

In some embodiments of the systems and methods described herein, the power input of the condensate extraction pump can be decreased from approximately 350 kilowatts to approximately 300 kilowatts. In these embodiments, power consumption by the cooling module is increased from approximately 185 kilowatts to approximately 215 kilowatts. In some such systems, the overall performance of the system is approximately 526.95 megawatts of energy and a combined cycle net efficiency of 60.74%. Additionally, the systems and methods can increase the efficiency of the power plant without requiring a significant redesign of major components of the power plant.

An exemplary technical effect of the systems, apparatus, and methods described herein includes at least one of: (a) standardizing the design and operational parameters of the gland steam condenser; (b) increasing efficiency of a power plant without required redesign of major components; and (c) decreasing the operational burden on the condensate extraction pump and/or the primary condenser.

The above description is meant to be exemplary only, and one skilled in the art will recognize that changes may be made to the embodiments described without departing from the scope of the invention disclosed. For example, the process steps described herein may be modified in duration, temperature, or time between cycles, for example. Still other modifications, which fall within the scope of the present invention, will be apparent to those skilled in the art, in light of a review of this disclosure, and such modifications are intended to fall within the appended claims.

Exemplary embodiments of a combined cycle power plant are described above in detail. The methods of operating a combined cycle power plant are not limited to the specific embodiments described herein, but rather, steps of the methods may be utilized independently and separately from other steps described herein. For example, the methods described herein are not limited to practice with combined cycle power plants as described herein. Rather, the exemplary embodiment can be implemented and utilized in connection with many other applications.

Although specific features of various embodiments of the invention may be shown in some drawings and not in others, this is for convenience only. Moreover, references to "one embodiment" in the above description are not intended to be interpreted as excluding the existence of additional embodiments that also incorporate the recited features. In accordance with the principles of the invention, any feature of a drawing may be referenced and/or claimed in combination with any feature of any other drawing.

While the invention has been described in terms of various specific embodiments, those skilled in the art will recognize that the invention can be practiced with modification within the spirit and scope of the claims.

What is claimed is:

1. A combined cycle power plant comprising:
   a gas turbine engine;
   a heat recovery steam generator configured to generate steam from exhaust of said gas turbine engine;
   a steam turbine fluidly coupled to said heat recovery steam generator for receiving steam from said heat recovery steam generator;
   a primary condenser fluidly coupled to said steam turbine for receiving a first portion of exhaust steam from said steam turbine and to condense the first portion of exhaust steam into a liquid fluid;
   a condensate extraction pump fluidly coupled to said primary condenser for receiving the condensed first portion of exhaust steam;
   a gland steam condenser fluidly coupled to said steam turbine for receiving a second portion of exhaust steam from said steam turbine and for condensing the second portion of exhaust steam into liquid form; and
   a cooling module fluidly connected to said gland steam condenser for supplying a cooling fluid to said gland steam condenser, said cooling module fluidly isolated from said condensate extraction pump;
   wherein said gland steam condenser operates with a pressure of between about 100 to about 180 pounds per square inch gauge of the cooling fluid therethrough.

2. The combined cycle power plant of claim 1, further comprising a feedwater pump fluidly coupled to said condensate extraction pump for channeling the liquid fluid from said condensate extraction pump to said heat recovery steam generator.

3. The combined cycle power plant of claim 1, wherein said cooling module comprises a closed cooling water fin fan cooler.

4. The combined cycle power plant of claim 3, wherein said cooling module is fluidly coupled to a generator cooler and a lube oil cooler.

5. The combined cycle power plant of claim 1, wherein said gland steam condenser operates with a flow rate of the cooling fluid between 400 and 600 gallons per minute therethrough.

6. The combined cycle power plant of claim 1, wherein said gland steam condenser operates at a temperature of between 50° Fahrenheit and 100° Fahrenheit.

7. The combined cycle power plant of claim 1, wherein said gland steam condenser operates using an input power between 4 and 8 kilowatts.

8. A gland steam condenser for a combined cycle power plant, said gland steam condenser fluidly coupled to a closed cooling water fin fan cooler, wherein said gland steam condenser operates with a pressure of between about 100 to about 180 pounds per square inch gauge of cooling fluid therethrough.

9. The gland steam condenser of claim 8, wherein said gland steam condenser operates with the pressure of between 110 and 130 pounds per square inch gauge of cooling fluid therethrough.

10. The gland steam condenser of claim 8, wherein said gland steam condenser operates with a flow rate of cooling fluid between 400 and 600 gallons per minute therethrough.

11. The gland steam condenser of claim 8, wherein said gland steam condenser operates with a flow rate of cooling fluid between 450 and 550 gallons per minute therethrough.

12. The gland steam condenser of claim 8, wherein said gland steam condenser operates using an input power between 4 and 8 kilowatts.

13. A method of operating a combined cycle power plant comprising, the method comprising:
   generating steam in a heat recovery steam generator;
   channeling the steam from the heat recovery steam generator through a steam turbine;
   channeling a first portion of exhaust steam from the steam turbine through a primary condenser and a condensate extraction pump;
   channeling a second portion of exhaust steam from the steam turbine into a gland steam condenser; and
   channeling cooling fluid at a pressure of between about 100 to about 180 pounds per square inch gauge through the gland steam condenser from a cooling module to condense the second portion of exhaust steam, the cooling module being fluidly isolated from the condensate extraction pump.

14. The method of claim 13, wherein channeling cooling fluid through the gland steam condenser from the cooling module further comprises channeling the cooling fluid at a flow rate between 400 to 600 gallons per minute.

15. The method of claim 13, wherein channeling cooling fluid through the gland steam condenser from the cooling module further comprises channeling the cooling fluid at a pressure between 110 and 130 pounds per square inch gauge.

16. The method of claim 13, further comprising operating the gland steam condenser with an input power between 4 and 8 kilowatts.

17. The method of claim 13, further comprising channeling the cooling fluid directly from the cooling module to the gland steam condenser.

18. The method of claim 13, further comprising:
channeling the cooling fluid from the cooling module to a generator cooler; and
channeling the cooling fluid from the generator cooler to the gland steam condenser.

19. A combined cycle power plant comprising:
a gas turbine engine;
a heat recovery steam generator configured to generate steam from exhaust of said gas turbine engine;
a steam turbine fluidly coupled to said heat recovery steam generator for receiving steam from said heat recovery steam generator;
a primary condenser fluidly coupled to said steam turbine for receiving a first portion of exhaust steam from said steam turbine and to condense the first portion of exhaust steam into a liquid fluid;
a condensate extraction pump fluidly coupled to said primary condenser for receiving the condensed first portion of exhaust steam; and
a cooling system fluidly isolated from said primary condenser and from said condensate extraction pump, said cooling system comprising:
a gland steam condenser coupled in flow communication with said steam turbine for receiving a second portion of exhaust steam from said steam turbine and for condensing the second portion of exhaust steam into liquid form; and
a closed cooling water fin fan cooler coupled in flow communication with said gland steam condenser for supplying a cooling fluid to said gland steam condenser.

20. The combined cycle power plant of claim 19, wherein said closed cooling water fin fan cooler is coupled in flow communication with a generator cooler and a lube oil cooler.

* * * * *